Feb. 21, 1967

C. L. ROBERSON ETAL
FEEDER FOR PRODUCTION OF FIBERS OF
HEAT-SOFTENABLE MATERIALS 3,305,332

Original Filed Dec. 31, 1956

CLETIS L. ROBERSON,
NELSON J. LEEDY,
JAMES D. RILEY
INVENTORS

BY

*Stachin & Overman*

ATTORNEYS

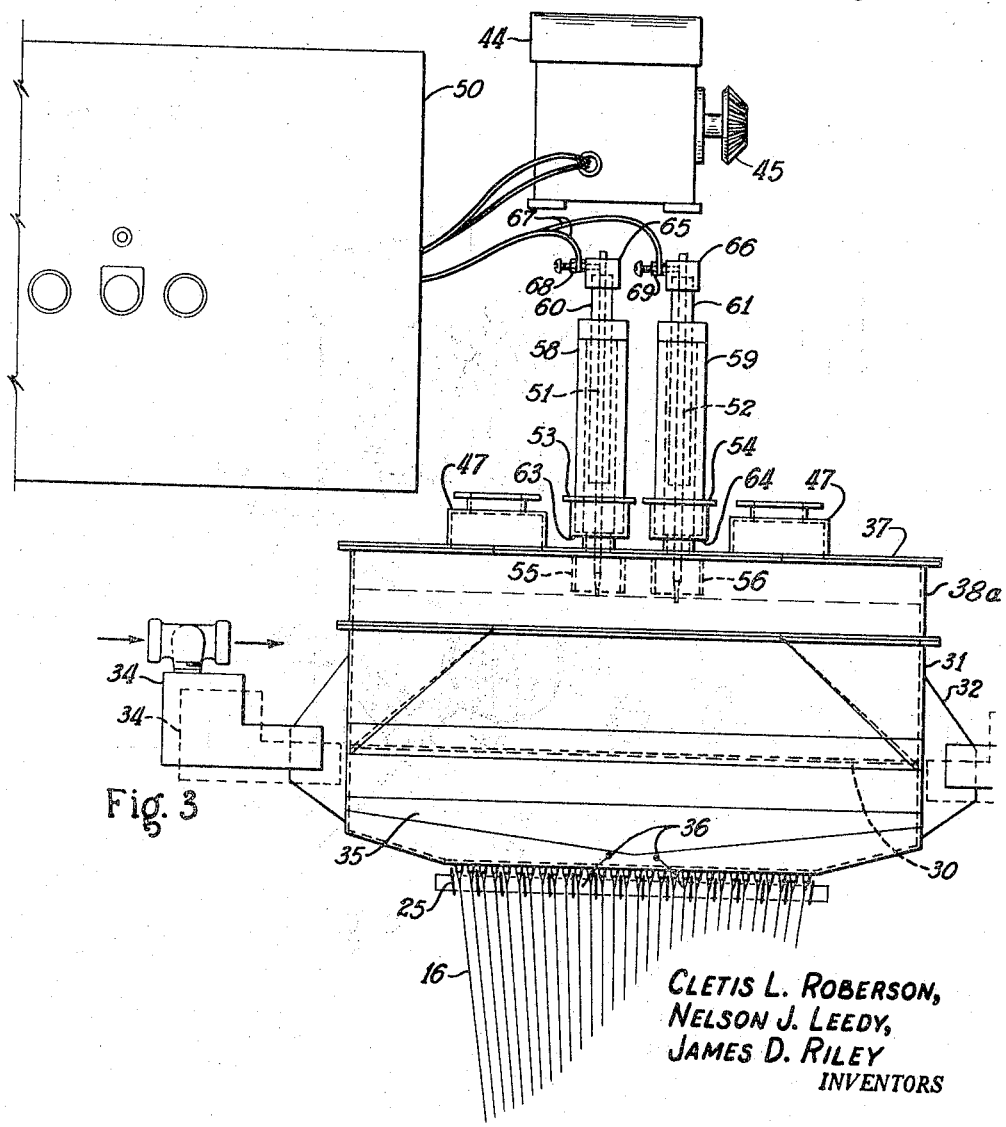

CLETIS L. ROBERSON,
NELSON J. LEEDY,
JAMES D. RILEY
INVENTORS

BY

ATTORNEYS

Feb. 21, 1967

C. L. ROBERSON ETAL 3,305,332

FEEDER FOR PRODUCTION OF FIBERS OF
HEAT-SOFTENABLE MATERIALS

Original Filed Dec. 31, 1956

CLETIS L. ROBERSON,
NELSON J. LEEDY,
JAMES D. RILEY
  INVENTORS

BY

ATTORNEYS

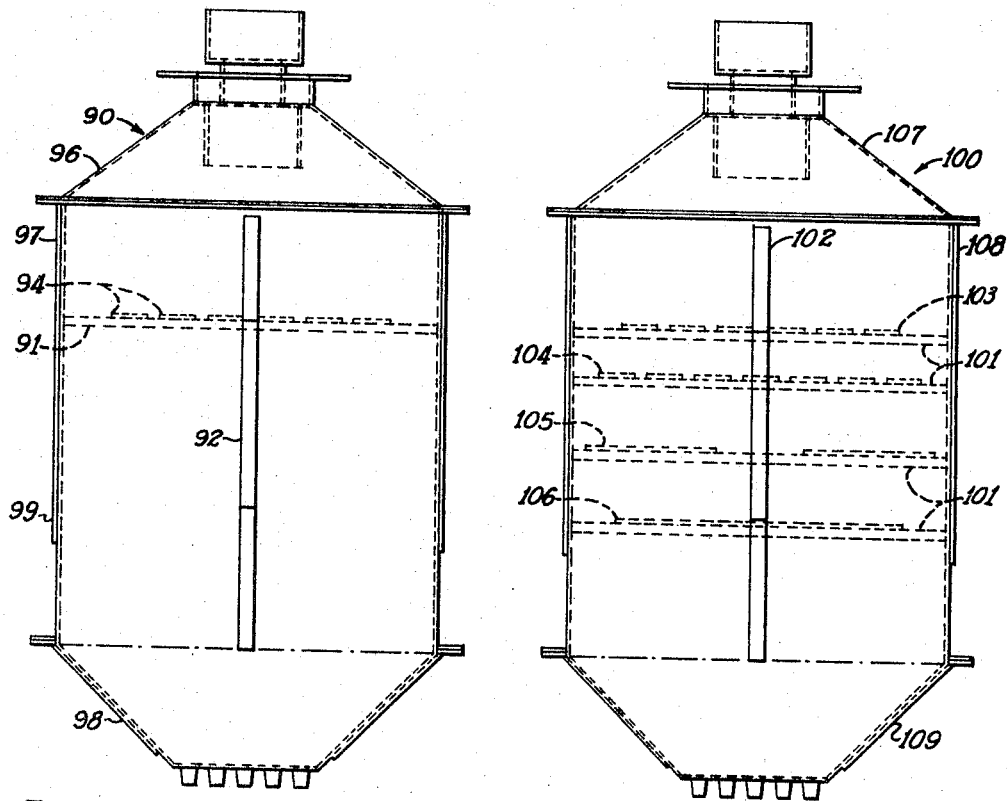
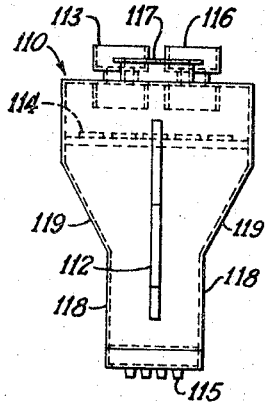
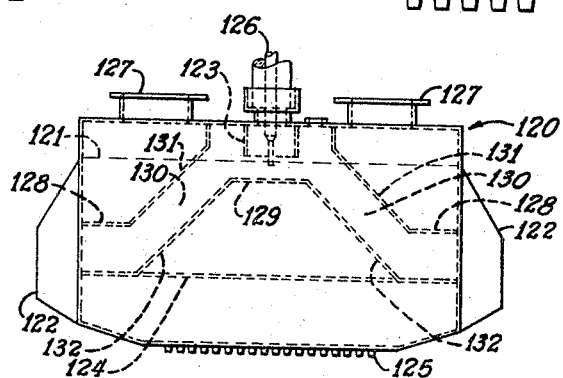

United States Patent Office 3,305,332
Patented Feb. 21, 1967

3,305,332
FEEDER FOR PRODUCTION OF FIBERS OF HEAT-SOFTENABLE MATERIALS
Cletis L. Roberson, Nelson J. Leedy, and James D. Riley, Newark, Ohio, assignors to Owens-Corning Fiberglas Corporation, a corporation of Delaware
Application Oct. 3, 1960, Ser. No. 60,126, now Patent No. 3,104,761, dated Sept. 24, 1963, which is a division of application Ser. No. 631,878, Dec. 31, 1956. Divided and this application Dec. 3, 1962, Ser. No. 241,964
3 Claims. (Cl. 65—11)

This is a division of our previous application, Serial Number 60,126, filed October 3, 1960, issued as Patent 3,104,761 on September 24, 1963, and which was a division of our earlier application Serial Number 631,878, filed on December 31, 1956, now abandoned.

This invention is related to the production of fibers of heat-softenable mineral material and more particularly to a method and means for the production of fibers of mineral material wherein desired characteristics of continuity of operation of the apparatus, and strength properties are imparted to the fibers produced, by providing a plurality of stages of heat control in the process of formation.

According to the invention as herein described, material in particulate form is heated and melted down into a molten pool and then flowed as streams from which fibers are attenuated. The mineral materials which can be melted down according to the invention are in the present instance exemplified by glass which is introduced into a melting unit as marbles.

It is a broad object of the present invention to provide an improved fiber forming operation in which greater control can be exercised over the physical properties of the fibers produced.

Another object of the invention is to improve the economy of fiber formation both by way of proper energy utilization and constancy of operation to promote elimination of wastage.

In accomplishing these objectives, the melting unit of the invention incorporates a feeder having a directly associated level control. The feeder or bushing also has an electrical current connection arrangement which permits control of heat distribution and generation of heat according to selectable predetermined characteristics. In this respect, the feeder terminal arrangement permits selection of a pattern of heating of the molten body into which the solid particulate material is introduced so that the heat utilized is concentrated in the zones where most needed.

Furthermore, the particulate form of the material, namely marbles in the present instance, are arranged to be preheated and fed to the melting unit at a regulated rate so that solid material is supplied to the molten pool at a more constant cyclic rate whereby cold spots and their consequent tendencies toward an erratic thermal history and unstable flow from the molten body are eliminated.

Further in this regard, the molten material flowed from the melter in the form of streams is arranged to be chilled upon emission to improve the operational continuity of the apparatus and to provide greater control of physical properties of the fibers. In this respect flow from a mass of molten material at extremely high temperatures is limited by surface tension of the material which tends to block the flow, whereas chilling of the material on emission from a high temperature body establishes a viscosity in the streams which resists surface tension of the material, thereby acting to prevent the formation of droplets and permitting continuous stable attenuation of fibers therefrom.

By incorporation of level controls directly in the feeder of the melting unit according to the present arrangement, a more exacting static head control is afforded and correspondingly control of temperature of the body is further made possible. Control of the gradient from the top of the molten mass, into which the solidified material is introduced, to the bottom of the mass from which the streams flow is also made possible, thereby permitting control of the thermal history of the material for desired physical properties in the fibers produced. Such operational characteristics are further enhanced by establishing substantially fixed rates of introduction and removal of material from the molten body to promote stability in the dynamics of thermal conditions of the body.

The foregoing, as well as other objects and features of the invention, will be made more apparent as this description proceeds, especially when considered in connection with the accompanying drawings wherein:

FIGURE 2 is a top plan view of the feeder incorporated in the melting unit of the apparatus illustrated in FIGURE 1;

FIGURE 3 is a side elevational view of the feeder of FIGURE 2 showing level sensing components in association therewith for maintaining a substantially fixed level of molten material therein;

FIGURE 10 is an end elevational view of the feeder of FIGURE 9;

FIGURE 11 is an end elevational view of still another feeder adaptable to use in accordance with the principles of the present invention having material heating members located at multiple levels within the feeder;

FIGURE 12 is an end elevational view of another feeder of the invention in which the lower section in the zone of the orifices is constricted in width; and FIGURE 13 is a side elevational view of still another feeder of the invention in which circuitous flow channels are provided for material melted therein.

Figure 1:
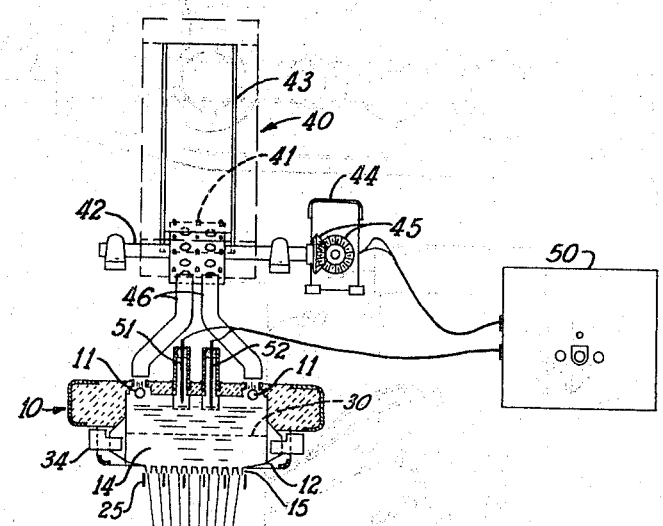
FIGURE 1 is a general layout of fiber forming apparatus partially in cross section and partially schematic to illustrate an arrangement of equipment incorporating the principles of the present invention.

Referring to the drawings in greater detail in which FIGURE 1 illustrates an over-all assembly of apparatus in accordance with the present invention, wherein a melting unit 10 is arranged to receive marbles 11 introduced thereto to be melted down within a pool of molten material 14 contained by a feeder 12.

The molten material 14 flows as streams from orificed tips 15 at the bottom of the feeder and are attenuated into continuous fibers 16 which are gathered into a strand 19 by passage over a gathering member 17 to which sizing fluid is fed from a tube 18 connected to a supply source, not shown, to lubricate the fibers prior to incorporation into the strand 19. The strand 19 is collected by a winder 20 having a rotary collet 22 on which the strand is wound into a package 24 as it is traversed by a suitable traversing device 21 for distribution in the package.

The marbles 11 fed to the melting unit 10 are supplied from a marble supply unit 40 incorporating a marble hopper 43 and a marble metering drum or roll 41. The metering roll 41 is driven by a motor and speed reducing drive unit 44 connected by way of bevel gears 45 to a shaft 42 on which the roll 41 is mounted. Upon controlled rotation of the roll 41 under the influence of controls more fully described hereinafter, marbles are fed to chutes 46 extending between the feed roll and melting unit 10. The level of the molten body 14 within the melting unit 10 is maintained constant by means of level-sensing probes 51 and 52 which are electrically associated with a control unit 50 which in turn is electrically connected to the drive unit 44. The assembly is arranged to automatically supply marbles to the melting unit 10 whenever the level of the body 14 approaches a low value thereby permitting maintenance of the material at a predetermined optimum level.

Figure 4:
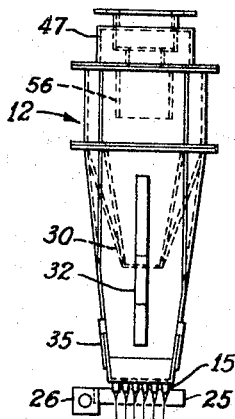
FIGURE 4 is an end elevational view of the feeder illustrated in FIGURES 2 and 3.

Referring now more particularly to the feeder or bushing and level control components, FIGURES 2, 3 and 4 illustrate a feeder 12 of a type adaptable to operation in a melting unit 10 in accordance with the principles of the present invention. The feeder structure is heated by electrical current passing therethrough and has a material containing portion which holds the material 14 melted therein. The feeder is accordingly made of a high temperature electrically conducting material such as platinum or other precious metals or alloys having high temperature resistant properties. The feeder is longitudinal in general shape and accommodates a plurality of orificed tips 15 in its bottom, such tips being oriented in aligned relationship across the width of the feeder. This permits association of shield member 25 with the feeder 10, the shield members being arranged in extended relation across the under part of the feeder between the rows of tips 15. The structure and operation of the shield members as utilized in the present instance are more fully described in Patent 2,908,036, issued in the name of Robert G. Russell on October 13, 1959. They are spaced, parallelly oriented, longitudinal blade-like members positioned in out-of-contact relation under the feeder and arranged so as to accommodate a pair of crosswise rows of tips between each adjacent pair. The shield members are cooled by suitable means such as a header 26 from which they extend (see FIGURE 4) so as to effect absorption of heat energy from the molten glass emitted from the tips, thereby forcibly cooling the glass. The shields at the same time offer protection against disruption in flow by guarding the flowing streams against air eddies or other extraneous atmospheric disturbances.

The feeder is of depth such that marbles introduced to the top thereof are fully melted down before reaching the bottom of the feeder for flow therefrom. The feeder depth dimension, importantly, is sufficiently great to provide a contained volume of molten material large enough that upon introduction of comparatively cool marbles 11 to the molten mass 14 thermal instabilities such as can occur by way of excessive cooling of the molten mass and consequently cause disrupting change in viscosity of the molten mass, will not occur. To further promote such thermal stability without need for maintenance of an excessively large mass for a given pull rate, and consequently to minimize the feeder size and the amount of precious metal required for the production of fibers at a given pull rate, an electrically heated foraminous metal web or screen 30 of high temperature, electrically conducting material such as platinum is extended across the interior of the feeder and arranged at levels such that it is completely immersed within the molten mass during normal operation of the equipment. The screen is dimensioned to act as a resistance-type heater which generates heat within the molten body and provides supplemental heat as needed to completely melt any partially melted marbles which may reach the level of the screen. Such marbles, which would otherwise tend to drop to the bottom of the feeder and possibly disrupt the free flow of material, are instead caught by the screen and held at the level thereof until completely melted.

The feeder is made up generally of an assembly of three structural sections, namely a material containing portion 31, an intermediate section 38a thereabove, and a cover plate 37 topping the assembly. The walls of the structural assembly are suitably dimensioned so that electrical current can pass therethrough to supply heat to material contained therein for establishment of a temperature above the melting point of the material.

The material-containing portion 31, beside having the orificed tips 15 projecting downwardly on the underside thereof, has a pair of ear-like electrical terminals 32 integrally joined to opposite ends of the feeder to permit electrical connections to be made therewith by a pair of water-cooled terminal clamps 34 which supply electrical current from a power source such as a power transformer (not shown). Each terminal 32 is integrally associated with the feeder for substantially the full height of the containing section 31, thereby permitting selectable positioning of the terminal clamps 34 on the terminals and consequent distribution of current through the feeder in accordance with desired patterns of generation of heat for supply to the molten mass 14.

The terminal clamps 34 in being water cooled absorb heat generated in or transferred to the terminals 32 from the feeder. Thus, the terminal clamps act as heat removing components which as a result develop temperature patterns at the bushing ends depending upon their positions on the terminals 32. If the terminal clamps 34 are in a low level position on the terminals 32, then the ends of the feeder in the feeding zone are cooled. If the terminal clamps are positioned at a high level on the terminals 32, then the ends of the feeding zone reach a higher temperature while heat is correspondingly removed more rapidly from the main body of the feeder.

The terminal clamps can also be moved inwardly and outwardly on the terminals to effect a change in heat pattern at the feeder tips. When the center of the feeder is relatively cold compared to the ends, the clamps may be moved outwardly to equalize the temperature across the feeder zone. Correspondingly, when the terminal clamps are moved inwardly on the terminals, the proximity of the cooled clamps to the feeder ends effects a greater absorption of heat from the ends. By way of example, for a feeder at a general temperature of 2300° F., variations in temperature in the feeder zone in the order of at least 100° F. can be effected by the inward and outward adjustment of the terminal clamp positions in this manner.

Metal strips 35 extending from one end to the other along the sides of the feeder 12 near the bottom of the container portion 31 act as reinforcement for the feeder bottom. Points 36 centrally located near the underside of the feeder where the orificed tips are located are adapted to receive in fixed contact therewith thermocouples for measurement of the operating temperature of the feeder in the zone of the tips. The temperature measured at these points is indicative of temperature of material emitted from the tips of the feeder.

The screen or web 30 extends downwardly into the material containing portion 31 to form, in a sense, a basket which is supported from points between the joining seam of the container portion 31 and the intermediate portions 36 of the feeder assembly. Thus, the current passing through the basket or screen 30 passes therethrough from points above the tops of the terminals 32. In view of this fact, the current passing through the screen 30 increases upon positioning of the terminal clamps 34 in the upper zones of the terminals 32 and conversely is reduced upon lowering of their contact positions on the terminals. The heat generated within the mass of molten material 14 by current passage through the screen thus can be selectably increased or decreased by changing positions of the terminal clamps 34 on the terminals 32. When the marbles introduced into the container portion do not melt down sufficiently by the time they drop to the lower levels of the basket formed by the screen 30, the terminals can be adjusted to a new position in an upper zone of the terminals 32 so that current passed through the screen will be increased for generation of more heat in the upper zone of the feeder.

The cover plate section 37 of the feeder 12 is provided with four openings to the interior of the feeder, each of which is surrounded by an upwardly projecting cylindrical stack-like structure. The two outer openings, having associated stacks 47 are adapted to receive marbles from the chutes 46 and in this respect are adaptable to having the chutes connected directly thereto. The two openings are spaced from each other so that the marbles are introduced generally into the center of each of the feeder halves located on opposite sides of its longitudinal center.

The two inner openings with their associated stack structures 53 and 54 are arranged to receive the sensing probes 51 and 52, respectively. The probes are longitudinal needle-like pointed metal rods of high temperature resistant electrically conducting material such as platinum and are each fixedly mounted concentrically within separate probe housings 58 and 59, respectively. The probes are electrically insulated from their housings by tubes 60 and 61, respectively, made of a high temperature resistant electrical insulating material, e.g., a refractory material, extending down into the probe housings. The housings 58 and 59 are supported in vertically oriented relationship on the respective shoulders 63 and 64 formed in the stack structures 53 and 54. Each of the insulating tubes 60 and 61 project upwardly beyond their respective housings and are provided with collars 65 and 66, respectively, adapted to hold electrical terminals 68 and 69 for electrical connection with the probes 51 and 52, respectively. The terminals are also arranged to allow vertical position adjustment of the probes in the upper part of the feeder 12.

The probes extend into the feeder to a depth equal to approximately one-half of the height of the intermediate section 36 of the feeder assembly. The probe 51 is arranged to be the main level sensing probe, and as such is so electrically connected by way of a connecting wire 67 to the controller 50 that when its extreme end or tip makes contact with the surface of the molten mass 14, a signal is established in the controller so that the drive 44 is maintained de-energized to withhold supply of marbles to the feeder. When, however, the resistance in the main probe circuit is increased, such as upon breakage of the contact between the probe and the surface of the molten material in the feeder, a signal is established in the control unit 50 to cause operation of the motor drive 44 for a supply of marbles to the feeder.

The second probe 52 is arranged to be a triggering means for an alarm to be operated when, for some extraneous reason, the molten material 14 in the feeder drops to an excessively low level. Accordingly, the end of the probe 52 is arranged to extend a slight distance deeper in the order of 1/32" to 1/16" than the end of the probe 51. Thus, the probe 52 has its end immersed in the molten mass 14 during all periods of normal operation of the feeder. When the level of the material drops below the end of the probe 52, however, the control unit 50 is arranged to set off an alarm to indicate to operators that erratic conditions exist in operation of the feeder. Suitable audible as well as visual alarm signalling means are readily associated with the control unit to indicate to operators when corrective measures are necessary.

The ends of the probes 51 and 52 extend to the surface of the molten material 14 within the bounds of the cylindrical guard walls 55 and 56, respectively, each of which extend from the underside of the cover plate 37 to a level a slight distance above the desired level for the molten body 14. Partially melted marbles or other extraneous material at the surface of the molten material are thereby prevented from contacting the probes and giving chance false level indications. In projecting to a level just above the surface of the molten material, the walls 55 and 56 provide a controlled level environment for the sensing zones by preventing disturbances at the surface of molten material in the areas surrounding the protected zones from being transmitted to the probes, thus assuring a more accurate sensing of the material level.

Figure 8:
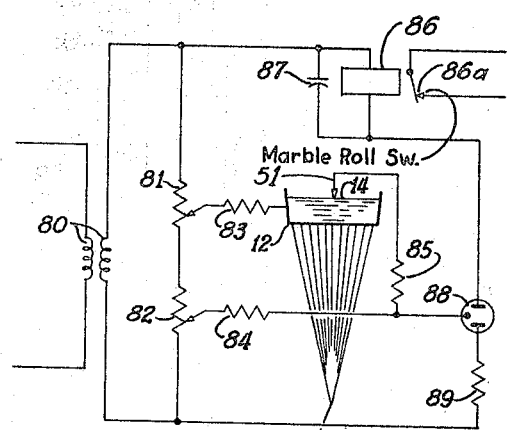
FIGURE 8 is a schematic diagram of the electrical control circuit for the apparatus of the invention.

FIGURE 8 illustrates the electrical circuitry associated with each of the probes 51 and 52 and in this instance the circuit for the main level probe 51 is shown. The circuit is designed purposely to operate on a small current which permits sensitive and exacting control regardless of the fact that the molten body being measured becomes part of the circuit. Only currents of a few microamperes are tolerable in electrical probe circuits. Large currents it has been found cause swelling or sponging of probe tips. Higher currents and voltages also produce arcing at probe tips in highly ionized atmospheres. With low current operation, the circuit can be adjusted to work on the cone of glass attenuated by probe tips so that actual contact with the glass is never lost, thereby permitting greater accuracy in the control of levels.

Electrical energy is supplied to the circuit by way of the transformer 80 which has connected in series across its secondary a switching relay 86, a cold cathode tube 88, and associated current-limiting resistor 89. The tube 88 when biased with a sufficiently positive voltage applied to its starter anode passes positive pulses of the A.C. supplied from the transformer to effect energization of the relay 86. Energization of relay 86 causes its normally closed contacts 86A to be opened, while de-energization thereof closes contacts 86A to energize the drive unit 44 for introduction of marbles 11 into the feeder.

In addition to the branch including tube 88, the transformer secondary has bridged thereacross a voltage divider branch made up of a pair of series connected resistances 81 and 82. The feeder 12 with its contained molten body 14 is connected to the voltage divider through a resistance 83, while the other side is connected through the probe 51 and grid of the tube 88. A resistance 84 is also connected between the voltage divider and the starter anode of the tube 88 in parallel with the feeder branch. By this arrangement, the starter anode has a voltage level established by the tap on resistance 82 below the critical value for firing the tube. Contact of the probe 51 with the glass adds an increment of in phase voltage sufficient to fire the tube. As long as the probe 51 makes contact with the molten material 14, the starter anode is maintained sufficiently positive to permit continued flow of current through the tube and accordingly to maintain the relay 86 energized. When the probe 51 breaks contact with the molten body 14 by reason of the level of the body falling below the predetermined desired level, the bias voltage supplied to the tube through the resistance 84 becomes less positive, stopping the flow of current to the relay and accordingly closing its contacts 86A to initiate introduction of marbles 11 by energizing the marble-supply drive unit 44.

The circuit associated with the probe 52 is identical to that described above and operates in a similar manner, except that it provides an alarm signal when the level of the molten body 14 drops below its lowest safe level.

Figure 5:
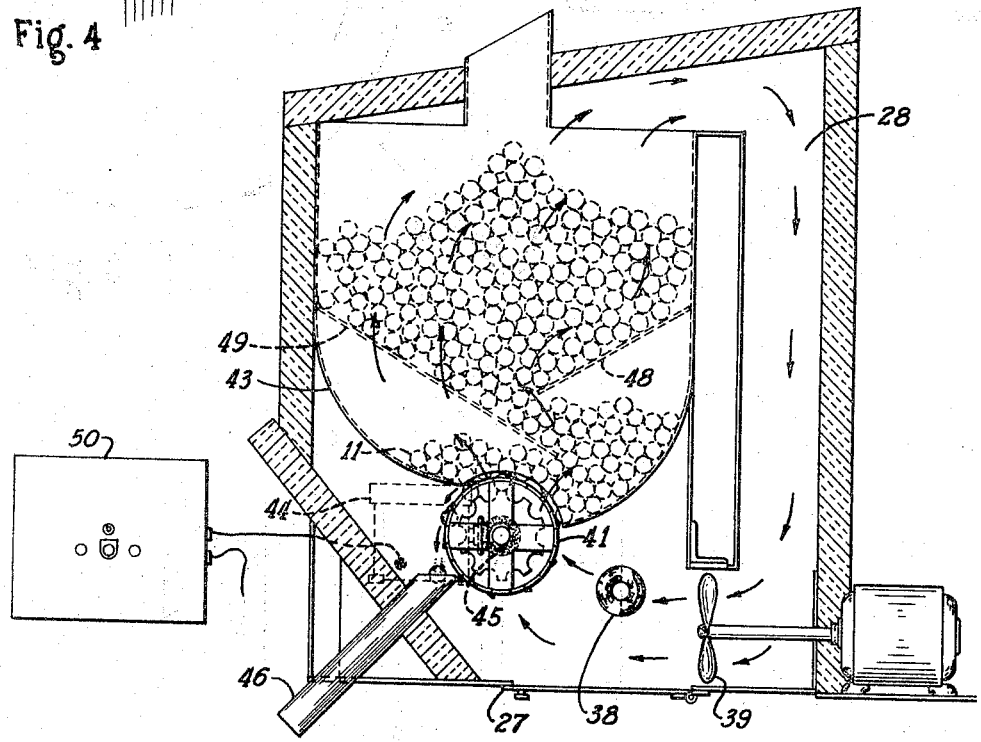
FIGURE 5 is a cross-sectional, side elevational view of a marble hopper and associated feed mechanism for supply of marbles to the melting unit shown in FIGURE 1.
Figure 6:
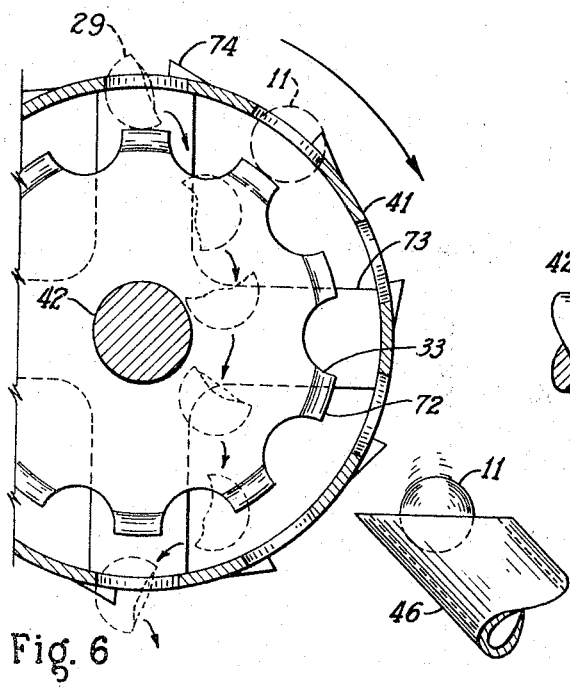
FIGURE 6 is a side elevational view in cross section of a marble feed roll or drum associated with the marble supply hopper of FIGURE 5.
Figure 7:
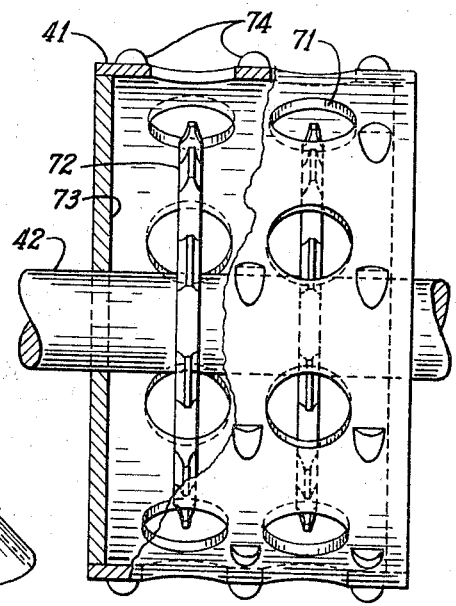
FIGURE 7 is a cut-away plan view of the marble feed roll illustrated in FIGURES 5 and 6.

FIGURE 5 illustrates the relationship of the marble metering roll 41 within the marble hopper 43, as well as with its drive 44 and electrical connection with the controller 50. FIGURES 6 and 7 additionally show details of the metering roll illustrating the manner in which marbles are conveyed from the hopper to the chutes 46 leading to the melting unit 10. The metering roll 41 is made up of a cylindrical shell having horizontally spaced rows of circumferentially aligned marble receiving apertures 71. The shell is fixedly mounted on a shaft 42 for rotation therewith by spoke members 73 extending from a hub portion fixed to the shaft. On the interior of the shell, and also mounted on the shaft 42, are a pair of circular disks 72 each aligned directly under one of the circumferential rows of apertures 71, as illustrated most clearly in FIGURE 7. The diameter of the disks 72, as can be seen in FIGURE 6, is such that a marble 11 deposited in one of the apertures 71 will rest on the edge of the disk 72 immediately thereunder and will be conveyed in a path about the center of the shaft 42 as the drum rotates to a point where the marble would be deposited in an end of the chute 46 such that the marble is in effect poured from its aperture upon reaching the end of the chute. If, however, the marbles are either chipped or non-uniform by reason of defects in formation, or for any other reason is smaller than normal size, the clearance between the edge of the disk 72 and the interior circumference of the shell of roll 41 is such that the defective marble will not remain on the edge of the disk within the aperture, but instead will drop through the space between the shell and the disk to the bottom of the roll. The defective marbles are collected on the interior of the roll and are moved about the roll interior as it rotates, as shown in FIGURE 6, until each of the broken marbles is dropped through one of the apertures 71. The defective marbles are thus dropped to the bottom of the marble supply unit 40 where they are accumulated for subsequent removal as waste through a trap-door type opening 27. By this arrangement, only marbles meeting predetermined dimensional standards of perfection will be deposited in the chutes 46 for transmission to the melting unit 10 thereby assuring introduction of marbles of predetermined tolerances in size and weight.

The metering roll 41 is arranged under an opening in the bottom of the hopper 43 where the marbles 11 are in effect funneled to the upper side of the roll. The surface of the roll is provided with marble agitating projections 74 which are inclined upwardly to a peak immediately adjacent a forward edge of each of the apertures 71 so that upon rotation of the roll under the hopper, marbles are caused to align themselves between the projections and in the path of the apertures 71 for deposition of one marble in each of the apertures. By providing the opening in the bottom of the hopper for an arcuate distance over the circumference of the roll 41 slightly greater than 90°, it has been found that deposition of a marble in each of the apertures 71 on rotation of the roll is assured. The profile of the projections 74 is arcuate so as to prevent jamming of the marbles by sharp edges.

As a variation of this structural arrangement, the marble roll surface can be provided with continuous ridge-like projections extending circumferentially about the drum on either side of each row of apertures 71. With such an arrangement, the apertures 71 cooperate with the ridge projections in functioning as agitators for the marbles to bring them into alignment for acceptance by the apertures.

By way of example, the rate of rotation of the roll 41 is in the order of ¾ r.p.m. for a fiber production rate of 40 pounds per hour. To reduce the rate of introduction of marbles to the melting unit for a lower fiber production rate, one or more rows of apertures in the roll 41 can be blanked out, such as by use of a band extending around each circumferential row of apertures. In this respect, it will be recognized that although in the present instance the roll 41 is shown with two rows of apertures for introduction of marbles to the melting unit, the roll could also be designed with a larger number of rows. As indicated, each circumferential row of apertures in the roll 41 has associated therewith a separate chute 46. Thus, on rotation of the roll 41, as many marbles are introduced to the melting unit 10 in each cycle of deposition of marbles in the chutes 46 as there are chutes connecting the roll to the melting unit.

The marbles in the hopper 43 are funneled to the metering roll 41 by baffle members 48 and 49 both of which overlap somewhat, but allow passage of marbles therebetween downwardly to the metering roll. The baffles are further arranged to be overhanging structural members which bear the load of the main mass of marbles in the hopper. Thus, the weight of all the marbles in the hopper is not borne directly by the roll 41, but rather the weight of only a small number of marbles in the hopper are borne thereby as determined by the number of marbles allowed to pass between the baffles 48 and 49 to the level thereunder.

The entire hopper 43 is housed in a box-like housing of suitable heat insulating material having a small opening at its top just large enough to permit introduction of marbles therethrough to the hopper and having a channel 28 leading from the upper portion of the hopper down to a level below the metering roll through which air may be circulated. A blower fan 39 is located directly in the channel or air passage 28 and is driven by a motor located exteriorly of the housing. The fan functions to force air up through the metering roll 41 and the hopper 43 to the upper interior of the housing for circulation downwardly to the underside of the hopper and subsequent recirculation. A radiant-type burner 38 is located in the zone under the hopper to heat air which passes it and to in turn transfer heat to the marbles on repassage of the air upwardly through the hopper. It has been found that marbles can be preheated to temperatures in the order of 1000° F. and above by circulation of heated air in this manner.

Thus, prior to introduction of the marbles into the melting unit, they can be preheated to a value such that considerable reduction can be effected in the amount of heat absorbed from the molten mass 14 upon their introduction to this mass. Accordingly, it will be recognized that the thermal disturbances effected upon introduction of the marbles to the molten mass is also minimized.

As a modification of this arrangement, electrical strip heaters can be provided within the marble hopper, for example, immediately under the baffles 48 and 49, to supply heat to the marbles in addition to that supplied by hot air passage therethrough, or as the sole source of heat for preheating the marbles.

Now having described the structural details and function of components of the assembly, the over-all cooperative operation of components will now be described. Marbles from the hopper 43 are fed to the metering roll 41 where marbles which are defective in shape beyond predetermined tolerances are sorted out by the roll 41 and are discarded as waste. The more perfect marbles are received and aligned in the roll apertures 41 for conveyance forward upon rotation of the roll for transfer of marbles to the chute 46. The roll 41 is rotated only when the level of the material in the feeder 12 drops below a pre-set value determined by the setting of the end of the level sensing probe 51. Contact of the sensing probe 51 with the molten material establishes a completed circuit through the control unit 50 which holds open the power supply circuit for the drive unit 44. Under these conditions no marbles are fed to the chutes 46. When the resistance of contact between the probe and the glass surface increases beyond a predetermined magnitude, such as when the probe end withdraws from the surface of the molten material and contact is broken between the probe and the molten material upon drop of the material level, the controller energizes the drive unit 44 to cause rotation of the roll 41 thereby depositing marbles into the chutes 46 for transfer to the melting unit 10. Upon a sufficient number of marbles being deposited in the melting unit, the level rises to a value which results in closure of the circuit associated with the sensing probe 51. This again results in the drum or roll 41 being halted until the next indication is given by the sensing probe that material is needed by the feeder to re-establish the predetermined desired level.

If for some reason, the level of the molten material within the feeder drops sufficiently below that which will maintain contact with both sensing probes 51 and 53, the control unit is arranged to set off an alarm indicating to the operator that the level in the feeder is dangerously low. Corrective measures can then be initiated to introduce sufficient material to the feeder to bring the level back up to the desired height at which the sensing probe 51 remakes contact with the surface of the material.

Since the marbles introduced into the melting unit 10 are already heated upon immersion in the molten mass 14, they do not absorb as much heat to effect the melting thereof as would otherwise be required if heated from normal ambient temperature external of the melting unit. The cooling or local chilling by the marbles and generation of incipient devitrification in the molten mass is thus prevented. Accordingly the quantity of molten material required within the feeder for maintenance of stable thermal conditions therein is smaller. In addition, preheating degasses the marbles in that adsorbed surface gases and moisture are driven off, thus reducing the possibility of interruptions being caused by occluded gases in the melt. Preheating of marbles also allows the melt to be maintained at a higher temperature for more thorough fining of the glass and more accurate control of its level in addition to reducing the heat work required of the platinum and promoting more uniform temperature throughout the melt.

The molten mass 14 in the feeder 12 is in a sense divided into two zones defined by the screen 30 which extends thereacross generally at a level approximately half way below the total depth of the mass. The terminal clamps 34 are so located on the terminals 32 that the heat generated by passage of current through the screen 30 is sufficient to cause the complete melt down of the marbles 11 at least by the time they reach the level of the screen, thereby preventing a clogging of flow of material from the top zone to the lower zone at the screen. The position of the terminal clamps 34 on the terminals 32 is also such that current passing through the walls of the feeder 12 is sufficient to heat the material contained therein from the interior wall surfaces toward the center of the body of molten material. The position of the clamps 34 is thus selected to provide the amount of wall current which will develop sufficient heat in the lower zone to maintain the temperature of the molten mass 14 at a desired value upon emission from the tips 15. In this respect, the clamps can be positioned on the terminals 32 for selection of the pattern of current passage through the feeder corresponding to the optimum continuity of material flow. The terminal clamps thus function with the terminals in a sense somewhat similar to a current divider.

Upon emission of molten material from the tips 15, the cooled shield members 25 absorb heat energy from the fluid cones of material which form at the orifices to effect a more rapid increase in viscosity of the material, thereby promoting more stable conditions for attenuation of the matter into continuous fibers. By so chilling the cones of material, the surface tension of the material is resisted to the extent that tendencies toward formation of droplets of the material is forcibly overcome, thus assuring continuity of attenuation of fibers 16 from the feeder.

By reason of the forceful chilling of the emitted matter, the temperature of the mass 14 can, in addition, be maintained at a higher temperature which is assuredly above the devitrification temperature of the material, and also at such temperature level that a quick melting of the marbles introduced thereto is effected. The uniform introduction of marbles at above atmosphere ambient temperature assures a uniform and non-disruptive thermal cycle for the mass 14, regardless of the fact that the heat of the mass is utilized to melt down the marbles. Furthermore, close regulation of the level of the molten mass 14 assures the presence of a sufficient quantity of material in the feeder to effect complete melting of the marbles without fear of excessive cooling of the material. In this respect, the level controls can be said to eliminate thermal channelling and unbalance of thermal conditions from end to end in the feeder.

Thus, over-all controls exist in the assembly to maintain a fixed pattern of introduction of heat energy to the material at each stage in the process of forming fibers from the marbles so that the thermal history of the matter is constantly uniform without the occurrence of cyclic thermal hunting.

Figure 9:
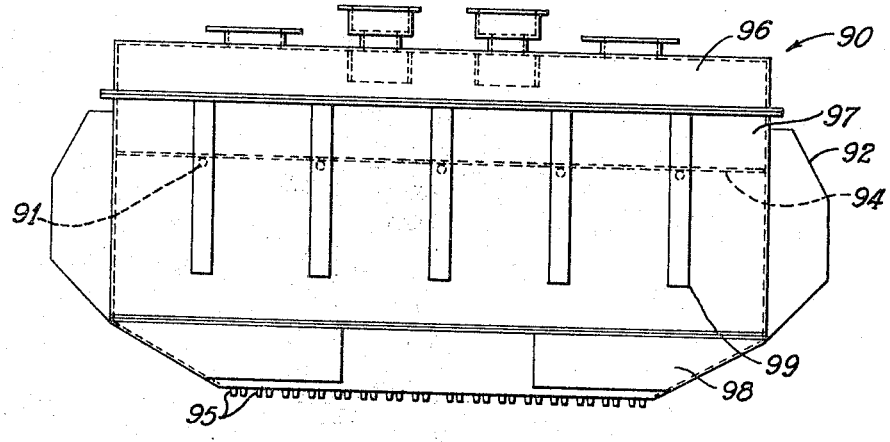
FIGURE 9 is a side elevational view of another feeder adaptable to use in accordance with the principles of the present invention in which material heating members are located at a relatively high level within the feeder.

FIGURES 9, 10 and 11 show two alternate types of feeders adaptable to operation in the assembly of FIGURE 1 in accordance with the principles of the present invention. FIGURES 9 and 10 show a feeder 90 consisting of three sections, namely a main body or containing portion 97 having an orificed section 98 joined thereto to form the feeder bottom with orificed tips projecting downwardly therefrom and aligned into a series of adjacent rows. The tip alignment across the width of the feeder bottom in pairs of rows, as may be seen in FIGURE 9, permits ready association of shield members therewith as in the manner illustrated with the feeder of FIGURES 1 and 3. A cover section 96 for the feeder is provided with four openings to permit supply of marbles and accommodation of sensing probes in the manner illustrated in the feeder of FIGURE 3. In this feeder, however, the cross-wise web through which current is passed from the feeder electrical terminals 92 is formed by longitudinal strips extending from one end of the feeder to the other and supported on cross-wise rods 91 extending from the interior of one wall to the interior of the opposite wall. The rods 91 extend across the feeder interior in positions where the body portion 97 is reinforced by vertical metal strips 99 which are intimately associated with the exterior of the feeder. The position of the cross-wise web of strips 94 is somewhat below the upper edges of the terminals 92, thereby permitting selection of a position for the terminal clamps on the terminals 92 which will establish the current flow and heat pattern desired for melting conditions in the feeder. The rods 91 and the strips 94 are both made of temperature resisting, electrically conducting material such as platinum with the dimensions of the strips 94 being such that the current flow therethrough will result in generation of heat within the mass in which the web is immersed. The strips 94 are flat and are supported on the rods 91 which in turn are spaced sufficiently close that when the temperature of the strips is raised to a value for melting the marbles introduced to the top of the feeder, sufficient bracing exists to prevent sagging thereof. Spacing of the strips 94 is close enough to prevent possible passage of solid material therebetween, yet great enough to offer a minimum of resistance to flow of material through the feeder.

FIGURE 11 illustrates still another feeder adaptable to incorporation in the assembly of FIGURE 1. In this feeder structure the body or main containing portion 108 is capped by a cover section 107 and has an orificed feeding section 109 joined thereunder which has orificed tips projecting from the under surface thereof. The ear-like terminals 102 extend for a vertical distance corresponding to the vertical dimension of the body portion 108 similar to the arrangement in the feeder of FIGURES 9 and 10.

This feeder differs from that of FIGURES 9 and 10 in having more than one cross-wise web within its interior for supply of heat to the molten mass contained therein. Four cross-wise webs of resistance heating members are provided in this feeder at different levels spaced generally equal distances apart extending from the top to the bottom of the body portion 108. The top web is formed by metal heating strips 103 which extend from one end to the other within the feeder and spaced slightly from each other to provide a filtering action for material passed therethrough, but also having wider gaps formed between the extreme end strips and side wall of the feeder. The second web, one level below the first, is formed by strips 104 similar to those of the topmost level but are staggered so as to have each strip positioned immediately below a gap between adjacent strips in the topmost level. This requires a zigzag flow of material passed through the two levels of heating strips and extends the path through which the material must flow to reach the bottom of the feeder. As a further extension of this concept, the third level has two plate members 105 extending from one end of the feeder to the other, both supported on the rods 101 but spaced from each other so that the largest space for passage of material through this level exists in the center of the molten mass. The fourth web similarly is made up of but a single plate, but centrally located immediately below the large gap formed below the two plates 105 in the level above. The plate 106 is solid completely across the width of the feeder but is centrally located to provide gaps at the side wall zones of the feeder. Thus, molten material passing from the top of the feeder to the bottom is required to take a zigzag path upon passage through the first two cross-wise webs, but in passing through the second two webs, the zigzag path is increased in length, thereby making the length of the path of material approaching the tip section 107 even greater and promoting the transfer of a greater amount of heat thereto before emission from the feeder. Correspondingly, the filtering action within the feeder is increased and the possibility of extraneous material reaching the feeder tips is practically eliminated.

FIGURE 12 shows another type of feeder adaptable to incorporation in the present arrangement wherein the lower section 118 is smaller in cross-sectional area than the upper portion 110. Intermediate the two levels, the walls 19 of the feeder are inclined closer together toward the lower level, thereby providing a feeder in which the molten body is predominantly heated in the larger upper portion where, because of its larger volume, the molten material is less influenced by introduction of the cooler matter to be melted down. Thus, the upper portion of the feeder acts as a reservoir wherein the colder solid particles have less influence in modification of thermal conditions within the feeder. Correspondingly, the zone of smaller cross-section in the lower part of the feeder which is supplied with material already melted down and already thermally more stable can exert greater control over temperature of the material in the zone of emission from the tips 115, since the volume over which control is exerted is relatively smaller.

The marbles to be melted down in the feeder are introduced through a pair of openings 117 on opposite ends of the feeder, while level detecting probes are inserted in the probe stacks 113 and 116 centrally located at the top of the feeder. Electrical connection is made to the feeder by way of its terminals 112 which extend from the lower portion to the upper portion at each end of the feeder. Heater strips 114 extending from one end to the other end of the feeder are located in the upper portion, spaced apart from each other across the width of the feeder between the walls 110.

Still another type of feeder adaptable to use in the arrangement above described is shown in FIGURE 13 wherein flow channels 130 are formed by spaced internal walls 131 and 132 which incline upwardly from the ends of the feeder toward the center of the feeder at an upper level. Marbles are introduced to the feeder through openings 127 and are melted in the end compartments formed by the walls 131 prior to kow through foraminous inlets 128 to the channels 130. The molten material flows upwardly through the channels 130 to the central area where the channels generally join above a foraminous inlet 129 to a lower central part of the feeder.

The material then flows through the inlet 129 to the central part of the feeder from which it flows through still another foraminous wall section 124 extending generally from one end of the feeder to the other, above the lower section containing the orifice tips 125.

A level control probe 126 is centrally disposed at the top of the feeder and extends downwardly within the bounds of a cylindrical guard wall 123 projecting from the underside of the top of the feeder. The probe is connected through electrical circuitry to the marble feeder and initiates supply of marbles as needed in a manner similar to that expressed above. The level of the molten material is maintained at a height such that the foraminous inlet 129 is always below the surface of the molten material and such that the compartments at either end of the feeder into which the solid material is supplied is sufficiently large that introduction of the marbles thereto will not appreciably effect modification in temperature of the molten material therein.

In view of the foregoing, it will be recognized that while we have shown certain particular embodiments of our invention, it will be understood that we do not wish to be limited entirely thereto since many modifications may be made within the concepts of the invention, and we, therefore, contemplate by the appended claims to cover all such modifications as fall within the true spirit and scope of our invention.

We claim:

1. A feeder for formation of fibers of heat-softenable material comprising a container portion for such material, means for metering at a uniform rate a supply of said material in solid form to said feeder, means for heating said feeder to melt said solid material into a molten pool thereof within said container portion, said feeder having orifices at the bottom of said container portion through which streams of said molten material flow for attenuation into fibers, level controls associated with said feeder for establishing a predetermined level of said molten material within said container portion, said level controls being associated with said supply means in such manner as to supply a metered quantity of said solid material to said feeder upon drop of the level of said pool below said predetermined level.

2. A feeder for formation of fibers of heat-softenable material comprising a container portion for such material, means for metering at a uniform rate a supply of said material in solid form to said feeder, means for heating said feeder to melt said solid material into a molten pool thereof within said container portion, said feeder having orifices at the bottom of said container portion through which streams of said molten material flow for attenuation into fibers, level controls associated with said feeder for establishing a predetermined level of said molten material within said container portion, said level controls comprising a probe extending down to a preset maximum level at which the upper surface of said pool is to be maintained, an electrical circuit for operating said supply means, an auxiliary circuit including said probe and pool being so associated with the circuit for said supply means that upon break in contact between said probe and pool, the supply means is operated to supply a quantity of said solid material sufficient to bring said pool surface into contact with said probe at said preset level.

3. A feeder for formation of fibers of heat-softenable material comprising an electrically conductive longitudinal melting container, electrical terminals for said container portion disposed at opposite ends of said container, said terminals making electrical engagement with said container portion over a distance extending substantially from the top to the bottom of said container portion, a source of electrical energy for said feeder, forcibly cooled terminal clamps for connection to said terminals at any of a number of selectable positions along the height of said terminals, said terminals also being sufficiently long in extension from said container ends to permit terminal clamp connection at any of a number of selectable positions along the length of said terminals thereby permitting connection of said clamps to said terminals for selection of desired patterns of heat distribution through said feeder.

References Cited by the Examiner

UNITED STATES PATENTS

| | | | |
|---|---|---|---|
| 1,764,045 | 6/1930 | Kelleher | 13—25 |
| 2,692,296 | 10/1954 | Piloenc et al. | 13—6 |
| 2,814,657 | 11/1957 | Labino | 65—1 |
| 3,012,373 | 12/1961 | Willis | 65—1 X |
| 3,028,442 | 4/1962 | Glaser | 13—6 |
| 3,111,550 | 11/1963 | Rushton | 13—6 |

S. LEON BASHORE, *Acting Primary Examiner.*

DONALL H. SYLVESTER, C. E. VAN HORN, F. W. MIGA, *Assistant Examiners.*